(12) United States Patent
Kishore et al.

(10) Patent No.: US 8,078,846 B2
(45) Date of Patent: Dec. 13, 2011

(54) CONDITIONAL MOVE INSTRUCTION FORMED INTO ONE DECODED INSTRUCTION TO BE GRADUATED AND ANOTHER DECODED INSTRUCTION TO BE INVALIDATED

(75) Inventors: Karagada Ramarao Kishore, Saratoga, CA (US); Xing Yu Jiang, Palo Alto, CA (US); Vidya Rajagopalan, Palo Alto, CA (US); Maria Ukanwa, Morgan Hill, CA (US)

(73) Assignee: MIPS Technologies, Inc., Sunnyvale, CA (US)

( * ) Notice: Subject to any disclaimer, the term of this patent is extended or adjusted under 35 U.S.C. 154(b) by 70 days.

(21) Appl. No.: 11/640,491

(22) Filed: Dec. 18, 2006

(65) Prior Publication Data

US 2008/0082795 A1 Apr. 3, 2008

Related U.S. Application Data

(60) Provisional application No. 60/853,314, filed on Sep. 29, 2006.

(51) Int. Cl.
*G06F 9/30* (2006.01)
(52) U.S. Cl. ........................................................ 712/219
(58) Field of Classification Search .................... 712/219
See application file for complete search history.

(56) References Cited

U.S. PATENT DOCUMENTS

| | | | |
|---|---|---|---|
| 5,091,851 A | | 2/1992 | Shelton et al. |
| 5,109,520 A | | 4/1992 | Knierim |
| 5,193,167 A | * | 3/1993 | Sites et al. ..................... 711/163 |
| 5,325,511 A | | 6/1994 | Collins et al. |
| 5,493,523 A | | 2/1996 | Huffman |
| 5,493,667 A | | 2/1996 | Huck et al. |
| 5,510,934 A | | 4/1996 | Brennen et al. |
| 5,526,504 A | | 6/1996 | Hsu et al. |
| 5,537,538 A | | 7/1996 | Bratt et al. |
| 5,546,545 A | | 8/1996 | Rich |
| 5,568,630 A | | 10/1996 | Killian et al. |

(Continued)

FOREIGN PATENT DOCUMENTS

GB 2304215 A 3/1997

(Continued)

OTHER PUBLICATIONS

PowerPC 604 RISC Microprocessor Technical Summary, Motorola, 1994.*

(Continued)

*Primary Examiner* — Keith Vicary
(74) *Attorney, Agent, or Firm* — Sterne, Kessler, Goldstein & Fox P.L.L.C.

(57) ABSTRACT

A conditional move instruction implemented in a processor by forming and processing two decoded instructions, and applications thereof. In an embodiment, the conditional move instruction specifies a first source operand, a second source operand, and a third operand that is both a source and a destination. If the value of the second operand is not equal to a specified value, the first decoded instruction moves the third operand to a completion buffer register. If the value of the second operand is equal to the specified value, the second decoded instruction moves the value of the first operand to the completion buffer. When the decoded instruction that performed the move graduates, the contents of the completion buffer register is transferred to a register file register specified by the third operand.

14 Claims, 4 Drawing Sheets

U.S. PATENT DOCUMENTS

| | | | |
|---|---|---|---|
| 5,572,704 A | 11/1996 | Bratt et al. | |
| 5,586,278 A | 12/1996 | Papworth et al. | |
| 5,604,909 A | 2/1997 | Joshi et al. | |
| 5,606,683 A | 2/1997 | Riordan | |
| 5,632,025 A | 5/1997 | Bratt et al. | |
| 5,670,898 A | 9/1997 | Fang | |
| 5,734,881 A | 3/1998 | White et al. | |
| 5,740,402 A | 4/1998 | Bratt et al. | |
| 5,758,112 A | 5/1998 | Yeager et al. | |
| 5,764,999 A | 6/1998 | Wilcox et al. | |
| 5,765,037 A | 6/1998 | Morrison et al. | |
| 5,781,753 A | 7/1998 | McFarland et al. | |
| 5,784,584 A | 7/1998 | Moore et al. | |
| 5,799,165 A | 8/1998 | Favor et al. | |
| 5,802,339 A | 9/1998 | Sowadsky et al. | |
| 5,802,386 A | 9/1998 | Kahle et al. | |
| 5,805,913 A * | 9/1998 | Guttag et al. | 712/209 |
| 5,809,326 A | 9/1998 | Nogami | |
| 5,809,336 A | 9/1998 | Moore et al. | |
| 5,848,433 A | 12/1998 | Tran et al. | |
| 5,881,257 A | 3/1999 | Glass et al. | |
| 5,884,061 A | 3/1999 | Hesson et al. | |
| 5,923,862 A * | 7/1999 | Nguyen et al. | 712/208 |
| 5,954,815 A | 9/1999 | Joshi et al. | |
| 5,961,629 A | 10/1999 | Nguyen et al. | |
| 5,966,734 A | 10/1999 | Mohamed et al. | |
| 6,044,478 A | 3/2000 | Green | |
| 6,076,159 A | 6/2000 | Fleck et al. | |
| 6,079,014 A | 6/2000 | Papworth et al. | |
| 6,085,315 A | 7/2000 | Fleck et al. | |
| 6,216,200 B1 | 4/2001 | Yeager | |
| 6,223,278 B1 | 4/2001 | Morrison | |
| 6,247,124 B1 | 6/2001 | Joshi et al. | |
| 6,249,862 B1 | 6/2001 | Chinnakonda et al. | |
| 6,266,755 B1 | 7/2001 | Yeager | |
| 6,269,436 B1 | 7/2001 | Tran et al. | |
| 6,298,438 B1 | 10/2001 | Thayer et al. | |
| 6,304,960 B1 | 10/2001 | Yeh et al. | |
| 6,308,252 B1 | 10/2001 | Agarwal et al. | |
| 6,393,550 B1 | 5/2002 | Fetterman | |
| 6,430,655 B1 | 8/2002 | Courtright et al. | |
| 6,473,837 B1 | 10/2002 | Hughes et al. | |
| 6,477,639 B1 | 11/2002 | Krishnan et al. | |
| 6,505,285 B1 | 1/2003 | Rabinovici et al. | |
| 6,546,477 B1 | 4/2003 | Russo et al. | |
| 6,557,127 B1 | 4/2003 | Adams et al. | |
| 6,594,728 B1 | 7/2003 | Yeager | |
| 6,598,148 B1 | 7/2003 | Moore et al. | |
| 6,691,221 B2 | 2/2004 | Joshi et al. | |
| 6,757,817 B1 | 6/2004 | Booth | |
| 6,760,835 B1 | 7/2004 | Yu | |
| 6,836,833 B1 | 12/2004 | Kinter et al. | |
| 6,915,395 B1 | 7/2005 | Singh | |
| 7,032,226 B1 | 4/2006 | Nemirovsky et al. | |
| 7,624,256 B2 * | 11/2009 | Sartorius et al. | 712/226 |
| 2002/0002666 A1* | 1/2002 | Dulong et al. | 712/224 |
| 2002/0019928 A1* | 2/2002 | Saulsbury | 712/222 |
| 2002/0103991 A1* | 8/2002 | Overkamp et al. | 712/219 |
| 2002/0112142 A1* | 8/2002 | Emer et al. | 712/8 |
| 2004/0148496 A1 | 7/2004 | Thimmannagari et al. | |
| 2004/0193858 A1 | 9/2004 | Ahmad et al. | |
| 2005/0102483 A1 | 5/2005 | Kinter et al. | |
| 2005/0246499 A1 | 11/2005 | Saida et al. | |
| 2006/0095732 A1 | 5/2006 | Tran et al. | |
| 2006/0149904 A1 | 7/2006 | Mowry | |
| 2006/0259747 A1 | 11/2006 | Gonzalez et al. | |
| 2009/0006811 A1* | 1/2009 | Badran-Louca et al. | 712/205 |

FOREIGN PATENT DOCUMENTS

| | | |
|---|---|---|
| GB | 2322718 A | 9/1998 |
| WO | WO 02/082278 A1 | 10/2002 |

OTHER PUBLICATIONS

Mahlke et al. (A Comparison of Full and Partial Predicated Execution Support for ILP Processors) ISCA '95, 1995 ACM, pp. 138-149.*

ADSP-21535 Blackfin™ DSP Brochure, Analog Devices, Inc., 4 pages (2001).

*Andes R10000 User's Manual*, Revision 2.0, MIPS Technologies, Inc., Entire Text (Sep. 19, 1996).

Arvind, A. and Maessen, J.-W., "Memory Model = Instruction Reordering + Store Atomicity," *ACM SIGARCH Computer Architecture News*, vol. 34, Issue 2, pp. 29-40 (May 2006).

Banakar, R. et al., "Scratchpad Memory: A Design Alternative for Cache On-chip memory in Embedded Systems," *Proceedings of CODES '02*, ACM, Estes Park, Colorado, pp. 73-78 (May 2002).

Bellas, N. et al., "Architectural and Compiler Techniques for Energy Reduction in High-Performance Microprocessors," *IEEE Trans. on Very Large Scale Integration (VLSI) Systems*, vol. 8, No. 3, pp. 317-326 (Jun. 2000).

Bird, P.L. et al., "The Effectiveness of Decoupling," *Proceedings of the 7th Int'l Conference on Supercomputing*, pp. 47-56, ACM Press, New York, NY (1993).

Bratt, J.P. et al., U.S. Appl. No. 08/168,094, filed Dec. 15, 1993, entitled "Superscalar Microprocessor Instruction Pipeline Including Instruction Dispatching and Kill Control".

Buti, T.N. et al., "Organization and implementation of the register-renaming mapper for out-of-order IBM POWER4 processors," *IBM J. Res. & Dev.* 49(1):167-188, International Business Machines Corporation (Jan. 2005).

Cotterell, S. and Vahid, F., "Tuning of Loop Cache Architecture to Programs in Embedded System Design," *ISSS'02*, 6 pages (Oct. 2002).

Courtright, D., "Introducing: The MIPS32™ 4Kc™ and MIPS32™ 4Kp™ Processor Cores 'Jade'," paper slide presentation distributed at the Embedded Microprocessor Forum, pp. 1-25 (May 1999).

Dally, W.J. et al., U.S. Appl. No. 09/637,500, filed Aug. 11, 2000, entitled "High Performance RISC Instruction Set Digital Signal Processor Having Circular Buffer and Looping Controls".

De Vries, H., *Understanding the detailed Architecture of AMD's 64 bit Core*, 85 pages, printed Oct. 16, 2007 from http://chip-architect.com/news/2003_09_21_Detailed_Architecture_of_AMDs_64bit_Core.html (Sep. 21, 2003).

Flynn et al., "Using Simple Tools to Evaluate Complex Architectural Trade-Offs," *IEEE Micro*, pp. 67-75 (Jul.-Aug. 2000).

Fukuoka, K. et al., "Leakage Power Reduction for Clock Gating Scheme on PD-SOI," *IEEE Computer Society Int'l Symp. on Circuits and Systems*, pp. 613-616 (2004).

Goodman, J.R. et al., "PIPE: A VLSI Decoupled Architecture," *ACM SIGARCH Computer Architecture News*, pp. 20-27, ACM Press, New York, NY (Jun. 1985).

Gwennap, L., "MIPS R10000 Uses Decoupled Architecture," *Microprocessor Report*, vol. 8, No. 14, pp. 1-5 (Oct. 24, 1994).

Gwennap, L., "MIPS R12000 to Hit 300 MHz," *Microprocessor Report*, vol. 11, No. 13, pp. 1-4 (Oct. 6, 1997).

Gwennap, L., "MIPS Roadmap Focuses on Bandwidth," *Microprocessor Report*, pp. 1-3 (May 12, 1997).

Gwennap, L., "SGI Provides Overview of TFP CPU," *Microprocessor Report*, vol. 7, No. 2, pp. 1-2 (Feb. 15, 1993).

Gwennap, L., "TFP Designed for Tremendous Floating Point," *Microprocessor Report*, vol. 7, No. 11, pp. 1-5 (Aug. 23, 1993).

Hennessy, J.L. and Patterson, D.A., *Computer Architecture: A Quantitative Approach—Third Edition*, Morgan Kaufmann Publishers, ISBN 1-55860-724-2, pp. 608-609 (2003).

*Intel Architecture Software Developer's Manual*—vol. 2: Instruction Set Reference, Intel. Corporation, pp. 3-278 and 3-279 (1997).

*Intel Architecture Software Developer's Manual*, vol. 1-3, pp. 2-7, 2-10, 2-11, 2-12, 3-329, 9-16, A-10, and A-20 (1999).

*Intel® StrongARM® SA-1100 Microprocessor Developer's Manual*, Intel. Corporation, pp. i-xix, 1-1 through 1-7, 2-1 through 2-8, and 6-1 through 6-7 (Aug. 1999).

Kandemir, M. et al., "Dynamic Management of Scratch-Pad Memory Space," *Proceedings of the 38th Design Automation Conference*, ACM, Las Vegas, Nevada, pp. 690-695 (Jun. 2001).

Kandemir, M. et al., "Exploiting Scratch Pad Memory Using Presburger Formulas," *Proceedings of ISSS '01*, ACM, Montreal, Quebec, Canada, pp. 7-12 (Oct. 2001).

Kandemir, M. et al., "Exploiting Shared Scratch Pad Memory Space in Embedded Multiprocessor Systems," *Proceedings of the 39th Design Automation Conference*, ACM, New Orleans, Louisiana, pp. 219-224 (Jun. 2002).

Kiyohara, T. et al., "Register Connection: A New Approach to Adding Registers into Instruction Set Architectures," *Int'l Conf on Computer Architecture—Proc. of the 20th Annual Int'l. Symp. on Computer Architecture*, San Diego, CA, pp. 247-256 (1993).

Krewell, K., "Intel Looks to Core for Success", Microprocessor Report, vol. 20, pp. 1, 4, 5 and 6 (Mar. 2006).

Lee, L.H. et al., "Instruction Fetch Energy Reduction Using Loop Caches for Embedded Applications with Small Tight Loops," *ISLPED '99*, pp. 267-269 (1999).

Lipasti, M. et al., "Physical Register Inlining," at <http://www.ece.wisc.edu/~pharm/papers/isca2004_egunadi.pdf>, 11 pages(retrieved Jun. 12, 2006).

Merten, M.C. et al., "Modulo Schedule Buffers", IEEE, pp. 138-149 (Dec. 2001).

*MIPS R10000 Microprocessor User's Manual, Version 2.0*, MIPS Technologies, Inc., 424 pages (Jan. 29, 1997).

Nass, R., "Latest DSPs Poised to Drive 3G Revolution," *Portable Design* 8(9):26, 27, 28, 32, and 34, PennWell Corporation, Fair Lawn, New Jersey (Sep. 2001).

Nemirovsky, M. et al., U.S. Appl. No. 09/602,279, filed Jun. 23, 2000, entitled "Methods and Apparatus for Background Memory Management".

Osborne, M. et al.,"Superscalar Pipeline Architectures," Slide Presentation, 36 pages, downloaded Jun. 19, 2007 from http://www.academic.marist.edu/~jzbv/architecture/projects2004/SuperscalarArchitectures.ppt (Apr. 19, 2004).

Panda, P. et al., "Data Memory Organization and Optimizations in Application-Specific Systems," *IEEE Design & Test of Computers*, IEEE, pp. 56-68 (May 2001).

Panda, P. et al., "Efficient Utilization of Scratch-Pad Memory in Embedded Processor Applications," *Proceedings of the European Design & Test Conference ED&TC 97*, IEEE, Paris France, pp. 7-11 (Mar. 1997).

Peng, M. and Azgomi, S., "Content-Addressable memory (CAM) and its network applications," at http://www.eetasia.com/ARTICLES/2000MAY/2000MAY03_MEM_NTEK_TAC.PDF, 3 pages (retrieved Jun. 12, 2006).

Pierce, J. and Mudge, T., "Wrong-Path Instruction Prefetching," *IEEE Computer Society 29th Int'l. Symp. on Microarchitecture*, pp. 165-175 (1996).

Price, C., *MIPS R10000 MIPS IV ISA Manual: Andes*, Revision 3.2, MIPS Technologies, Inc., 323 pages(Sep. 1995).

Rhodes, S., *MIPS R8000 Microprocessor Chip Set User's Manual*, Revision 3.0, Silicon Graphics, Inc., 352 pages (Jul. 1994).

Schmidt, D.C., "Transparently Parameterizing Synchronization into a Concurrent Distributed Application: A Case Study of C++ Design Evolution," *C++ Report*, SIGS Publications, vol. 6, No. 3, 10 pages (Jul.-Aug. 1994).

Smith, J.E. et al., "The ZS-1 Central Processor," *Proceedings of the Second Int'l Conference on Architectural Support for Programming Languages and Operating Systems*, pp. 199-204, IEEE Computer Society Press, Los Alamitos, CA (1987).

Smith, J.E., "Retrospective: Decoupled Access/Execute Computer Architectures," *25 Years of the international Symposia on Computer Architecture (Selected Papers)*, pp. 27-28, ACM Press, New York, NY (Jun. 1998).

Solomon, B. et al., "Micro-Operation Cache: A Power Aware Frontend for Variable Instruction Length ISA," *Symp. on Low Power Electronics and Design*, pp. 4-9 (Aug. 2001).

*SPARC64 V Processor for UNIX Server*, Revision 1.0, Fujitsu Limited, 24 pages (Aug. 2004).

Sung, M. et al., "Multithreading Decoupled Architectures for Complexity-Effective General Purpose Computing," *ACM SIGARCH Computer Architecture News*, vol. 29—Issue 5, pp. 56-61, ACM Press, New York, NY (Dec. 2001).

Taylor, M., *The Raw Prototype Design Document*, Dept. of Electrical Engineering and Computer Science—Massachusetts Institute of Technology, pp. 1, 5, 6, 10, and 53 (Nov. 1999).

$V_R$*Series™ User's Manual:$V_R$10000™ Microprocessor, Version 1.0*, NEC, Entire Text (Nov. 1995).

Watts, C. et al., "ARM Intelligent Energy Manager Future Evolution," paper slide presentation distributed at the ARM Developers' Conference '04, 34 sheets (Oct. 2004).

Yeager, K.C., "The MIPS R10000 Superscalar Microprocessor," *IEEE Micro*, pp. 28-40 (1996).

Notification Concerning Transmittal of International Preliminary Report on Patentability, International Application No. PCT/US2007/021005, International Filing Date: Sep. 28, 2007.

Notification of Transmittal of the International Search Report and the Written Opinion of the International Searching Authority, mailed Jul. 16, 2008, for International Application No. PCT/US07/21005, International Filing Date: Sep. 28, 2007, 3 pages.

Examination Report, dated Jan. 12, 2011, for GB Patent Appl. No. GB0904889,3, 3 pages.

\* cited by examiner

CONDITIONAL MOVE INSTRUCTION FORMED INTO ONE DECODED INSTRUCTION TO BE GRADUATED AND ANOTHER DECODED INSTRUCTION TO BE INVALIDATED

CROSS REFERENCE TO RELATED APPLICATION

This application claims priority under 35 U.S.C. §119(e) to U.S. Provisional Patent Application No. 60/853,314, filed on Sep. 29, 2006, titled "Twice Issued Conditional Move Instruction, And Applications Thereof".

FIELD OF THE INVENTION

The present invention is generally directed to processors.

BACKGROUND OF THE INVENTION

Reduced Instruction Set Computer (RISC) processors are well known. RISC processors have instructions that facilitate the use of a technique known as pipelining. Pipelining enables a processor to work on different steps of an instruction at the same time and thereby take advantage of parallelism that exists among the steps needed to execute an instruction. As a result, a processor can execute more instructions in a shorter period of time. Additionally, modern Complex Instruction Set Computer (CISC) processors often translate their instructions into micro-operations (i.e., instructions similar to those of a RISC processor) prior to execution to facilitate pipelining.

Instruction set architectures (ISA) for RISC processors limit the number of operands that can be operated upon by a single instruction. One way to increase the number of operands that can be operated upon by a single instruction is to add additional ports to a register file of the processor. Such an approach, however, is expensive both in terms of area and timing. An alternative approach is to stall the pipeline while an instruction is implemented. This approach is also expensive in terms of timing.

What is needed are techniques and apparatuses for implementing instructions that overcome the limitations noted above.

BRIEF SUMMARY OF THE INVENTION

The present invention provides apparatuses, systems, and methods for implementing a conditional move instruction, and applications thereof. In an embodiment, a first decoded instruction and a second decoded instruction are formed from a conditional move instruction that specifies a first source operand, a second source operand, and a third operand that is both a source and a destination. If the value of the second operand is not equal to a specified value, the first decoded instruction moves the third operand to a completion buffer register. If the value of the second operand is equal to the specified value, the second decoded instruction moves the value of the first operand to the completion buffer. When the decoded instruction that performed the move graduates, the contents of the completion buffer register is transferred to a register file register specified by the third operand.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when read in conjunction with the drawings. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

The present invention provides apparatuses, systems, and methods for implementing a conditional move instruction, and applications thereof. In the specification, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1A:
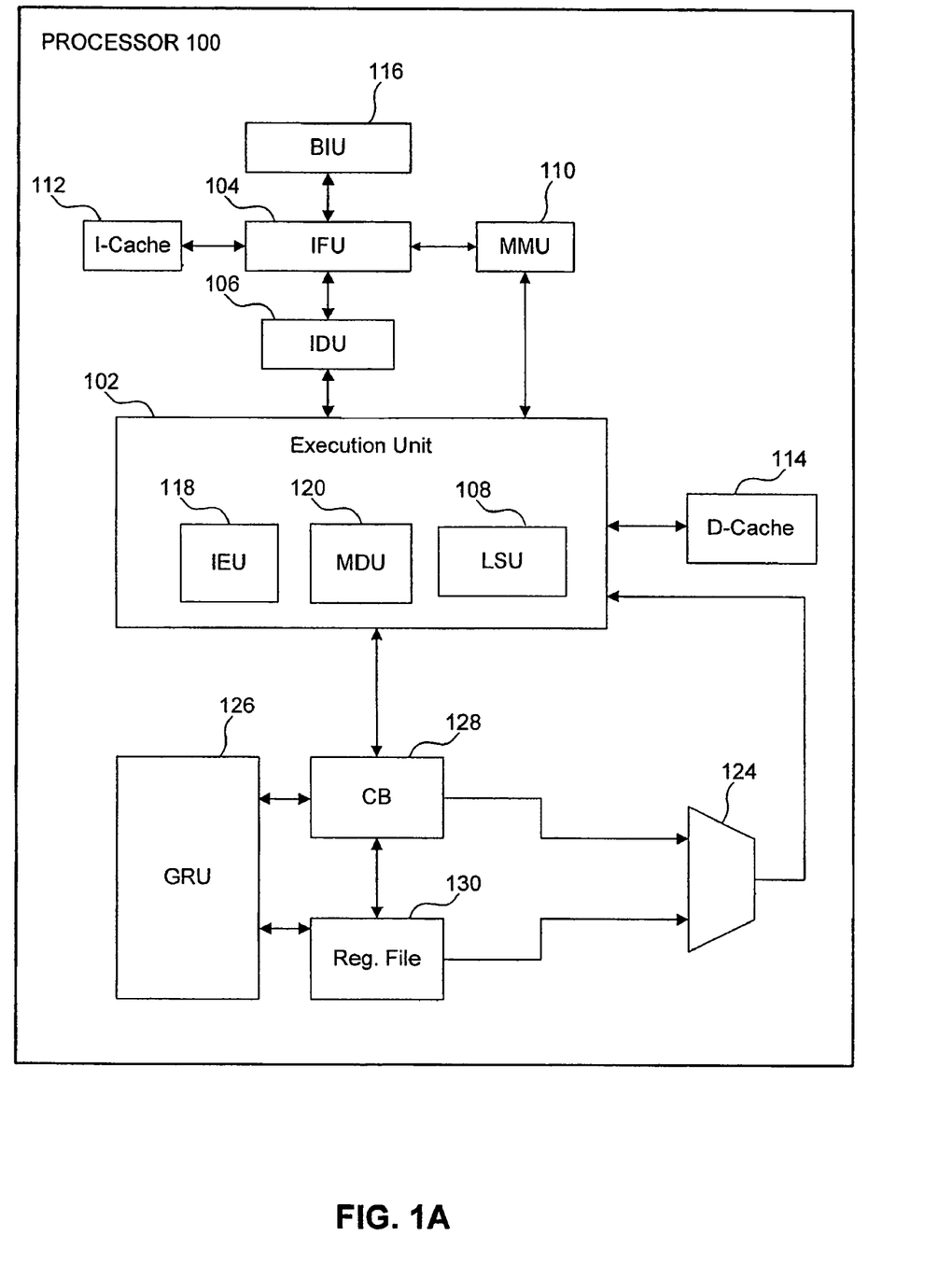
FIG. 1A is a diagram that illustrates a processor according to an embodiment of the present invention.

FIG. 1A is a diagram of a processor 100 according to an embodiment of the present invention. Processor 100 is capable of implementing a conditional move instruction. Processor 100 preferably implements a load-store, reduced instruction set computer (RISC) architecture. The various components and features of processor 100 illustrated in FIG. 1A are described below.

While processor 100 is described herein as including several separate components, many of these components are optional components that are not present in each embodiment of the present invention, or components that may be combined, for example, so that the functionality of two components reside within a single component. Thus, the individual components shown for example in FIG. 1A are illustrative and not intended to limit the present invention.

As shown in FIG. 1A, processor 100 includes one or more execution units 102. In an embodiment, execution units 102 include an integer execution unit (IEU) 118 and a load/store unit (LSU) 108. IEU 118 handles arithmetic operations, such as logical operations, shift operations, add operations, and/or subtract operations. LSU 108 handles load/store operations.

In a further embodiment, execution units 102 also include, for example, a multiply/divide unit (MDU) 120 to perform multiply and divide operations.

In an embodiment, execution units 102 interact with data stored in registers of a register file (RF) 130 and/or data stored in registers of one or more completion buffers (CB) 128. A multiplexer 124 is used to select data from RF 130 or CB 128. In an embodiment, a first completion buffer 128 includes 64-bit registers for storing data from integer execution unit 118 and multiply/divide unit 120. A second completion buffer 128 includes 32-bit registers for storing data from load/store unit 108. Optionally, one or more additional register file sets can be included to minimize content switching overhead, for example, during interrupt and/or exception processing.

Execution units 102 interface with an instruction dispatch unit (IDU) 106, a memory management unit (MMU) 110, and data cache 114.

Instruction fetch unit (IFU) 104 is responsible for providing instructions to instruction dispatch unit 106. In one embodiment, instruction fetch unit 104 includes control logic for instruction cache 112, an optional recoder for recoding compressed format instructions, an instruction buffer to decouple operation of instruction fetch unit 104 from execution units 102, and an interface to a scratch pad (not shown). In an embodiment, instruction fetch unit 104 performs dynamic branch prediction. Instruction fetch unit 104 interfaces with instruction dispatch unit 106, memory management unit 110, instruction cache 112, and bus interface unit (BIU) 116.

Instruction dispatch unit 106 is responsible for decoding instructions received from instruction fetch unit 104 and dispatching them to execution units 102 when their operands and required resources are available. In an embodiment, instruction dispatch unit 106 may receive up to two instructions in order from instruction fetch unit 104 per cycle. The instructions are assigned an instruction identification value and a completion buffer identification value (CBID). The CBID identifies a buffer location or entry in completion buffer 128 that can be used to hold results temporarily before they are committed to the architectural state of processor 100 by writing the results to register file 130.

Instruction dispatch unit 106 also performs operand renaming to facilitate forwarding of data. Renamed instructions are written into a decoded instruction buffer 113 (see FIG. 1B). The oldest instructions stored in the decoded instruction buffer 113 that have all their operands ready and meet all resource requirements are dispatched to an appropriate execution unit for execution. Instructions may be dispatched out-of-program-order to execution units 102. Dispatched instructions do not stall in the execution pipe, and they write their results into completion buffer 128.

In an embodiment, instruction dispatch unit 106 also keeps track of the progress of an instruction through pipeline stages, for example, within execution units 102 and updates the availability of operands in a rename map and in all dependent instructions that are in the decoded instruction buffer. Instruction dispatch unit 106 also writes the instruction identification, CBID, and related information values into structures in graduation unit 126.

Memory management unit 110 translates virtual addresses to physical addresses for memory access. In one embodiment, memory management unit 110 includes a translation lookaside buffer (TLB) and may include a separate instruction TLB and a separate data TLB. Memory management unit 110 interfaces with instruction fetch unit 104 and load/store unit 108.

Instruction cache 112 is an on-chip memory array organized as a multi-way set associative cache such as, for example, a 2-way set associative cache or a 4-way set associative cache. Instruction cache 112 is preferably virtually indexed and physically tagged, thereby allowing virtual-to-physical address translations to occur in parallel with cache accesses. In one embodiment, the tags include a valid bit and optional parity bits in addition to physical address bits. Instruction cache 112 interfaces with instruction fetch unit 104.

Data cache 114 is also an on-chip memory array organized as a multi-way set associative cache such as, for example, a 2-way set associative cache or a 4-way set associative cache. Data cache 114 is preferably virtually indexed and physically tagged, thereby allowing virtual-to-physical address translations to occur in parallel with cache accesses. Data cache 114 interfaces with load/store unit 108.

Bus interface unit 116 controls external interface signals for processor 100. In one embodiment, bus interface unit 116 includes a collapsing write buffer used to merge write-through transactions and gather writes from uncached stores.

Load/store unit 108 is responsible for handling load/store instructions to read/write data from data caches and/or memory. Load/store unit 108 is capable of handling loads and stores issued out-of-program-order.

Integer execution unit 118 executes integer instructions. It is capable of handling instructions issued out-of-program order. Integer execution unit 118 includes an arithmetic logic unit for performing arithmetic operations such as add, subtract, shift and logic operations. Integer execution unit 118 interfaces with and operates on data stored in completion buffer 128 and register file 130.

Multiply/divide unit 120 contains a pipeline for integer multiply and divide operations. This pipeline preferably operates in parallel with the integer execution pipeline in integer execution unit 118 and has a separate write port into completion buffer 128. In an embodiment, multiply/divide unit 120 looks ahead and informs instruction dispatch unit 106 that a divide operation is about to complete so that there are no bubbles in the multiply/divide unit pipeline.

Graduation unit 126 ensures instructions graduate and change the architectural state of processor 100 in-program order. Graduation unit 126 also releases buffers and resources used by instructions prior to their graduation.

Figure 1B:
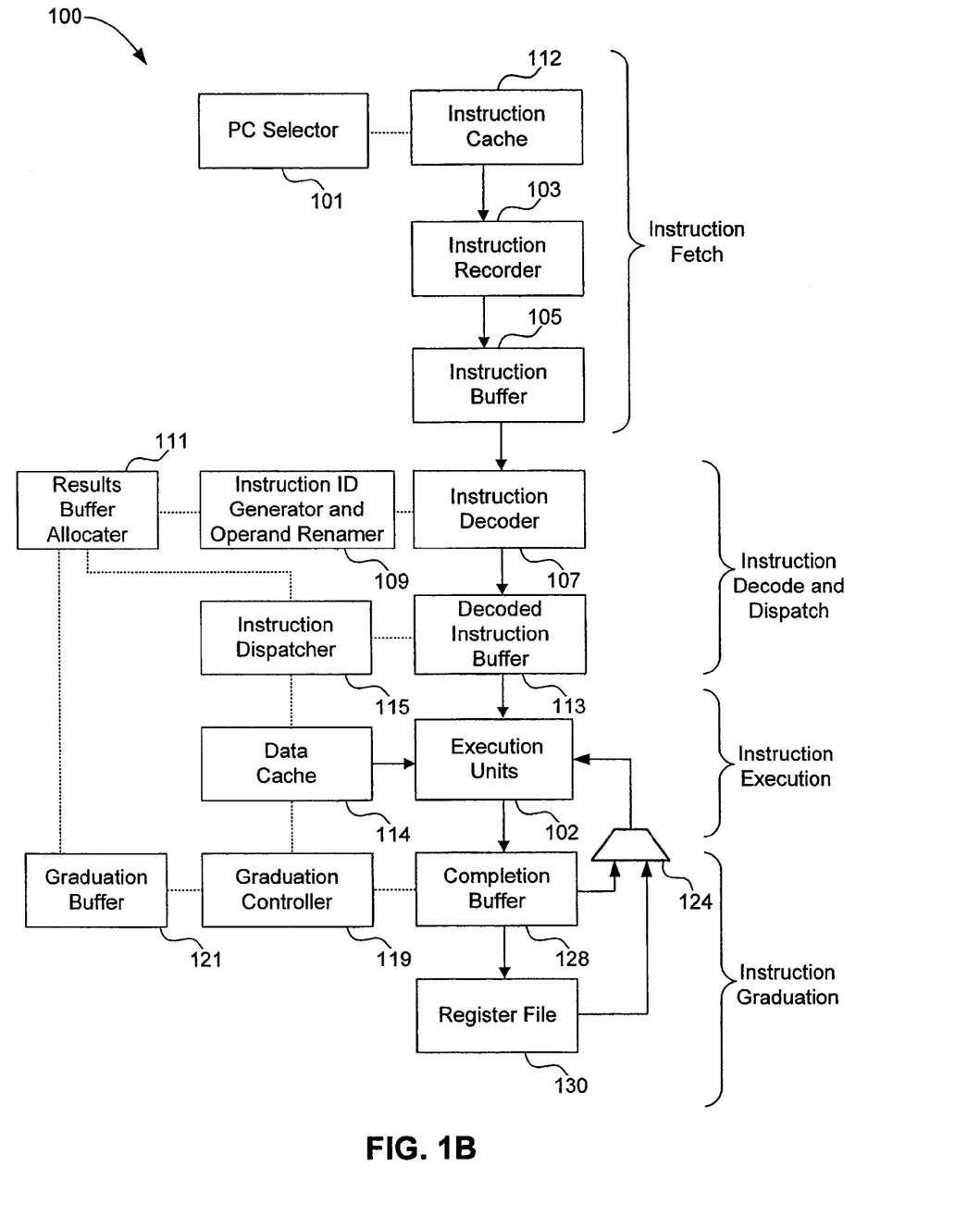
FIG. 1B is a diagram that further illustrates the processor of FIG. 1A.

FIG. 1B further illustrates the operation of processor 100. As illustrated in FIG. 1B, processor 100 performs four basic functions: instruction fetch; instruction decode and dispatch; instruction execution; and instruction graduation. These four basic functions are illustrative and not intended to limit the present invention.

Instruction fetch (represented in FIG. 1A by instruction fetch unit 104) begins when a PC selector 101 selects amongst a variety of program counter values and determines a value that is used to fetch an instruction from instruction cache 112. In one embodiment, the program counter value selected is the program counter value of a new program thread, the next sequential program counter value for an existing program thread, or a redirect program counter value associated with a branch instruction or a jump instruction. After each instruction is fetched, PC selector 101 selects a new value for the next instruction to be fetched.

During instruction fetch, tags associated with an instruction to be fetched from instruction cache 112 are checked. In one embodiment, the tags contain precode bits for each instruction indicating instruction type. If these precode bits indicate that an instruction is a control transfer instruction, a branch history table is accessed and used to determine whether the control transfer instruction is likely to branch or likely not to branch.

In one embodiment, any compressed-format instructions that are fetched are recoded by an optional instruction recoder 103 into a format that can be decoded and executed by processor 100. For example, in one embodiment in which processor 100 implements both 16-bit instructions and 32-bit instructions, any 16-bit compressed-format instructions are recoded by instruction recoder 103 to form instructions having 32 bits. In another embodiment, instruction recoder 103 recodes both 16-bit instructions and 32-bit instructions to a format having more than 32 bits.

After optional recoding, instructions are written to an instruction buffer 105. In one embodiment, this stage can be bypassed and instructions can be dispatched directly to an instruction decoder 107.

Instruction decode and dispatch (represented in FIG. 1A by instruction dispatch unit 106) begins, for example, when one or more instructions are received from instruction buffer 105 and decoded by instruction decoder 107. In one embodiment, following resolution of a branch mis-prediction, the ability to receive instructions from instruction buffer 105 may be temporarily halted until selected instructions residing within the instruction execution portion and/or instruction graduation portion of processor 100 are purged.

In parallel with instruction decoding, operands are renamed. Register renaming map(s) located within instruction identification (ID) generator and operand renamer 109 are updated and used to determine whether required source operands are available, for example, in register file 130 and/or a completion buffer 128. A register renaming map is a structure that holds the mapping information between programmer visible architectural registers and internal physical registers of processor 100. Register renaming map(s) indicate whether data is available and where data is available. As will be understood by persons skilled in the relevant arts given the description herein, register renaming is used to remove instruction output dependencies and to ensure that there is a single producer of a given register in processor 100 at any given time. Source registers are renamed so that data is obtained from a producer at the earliest opportunity instead of waiting for the processor's architectural state to be updated.

Also in parallel with instruction decoding, instruction identification (ID) generator and operand renamer 109 generates and assigns an instruction identification tag to each instruction. An instruction identification tag assigned to an instruction is used, for example, to determine the program order of the instruction relative to other instructions. In one embodiment, each instruction identification tag is a thread-specific sequentially generated value that uniquely determines the program order of instructions. The instruction identification tags can be used to facilitate graduating instructions in-program order, which were executed out-of-program order.

Each decoded instruction is assigned a completion buffer identification value or tag by a completion buffer allocater 111. The completion buffer identification value determines the location in completion buffer 128 where instruction execution units 102 can write calculated results for an instruction. In one embodiment, the assignment of completion buffer identification values is accomplished using a free list. The free list contains as many entries as the number of entries in completion buffer 128. The free list can be implemented, for example, using a bitmap. A first bit of the bitmap can be used to indicate whether the completion buffer entry is either available (e.g., if the bit has a value of one) or unavailable (e.g., if the bit has a value of zero).

Assigned completion buffer identification values are written into a graduation buffer 121. In one embodiment, completion buffer completion bits associated with newly renamed instructions are reset/cleared to indicate incomplete results. As instructions complete execution, their corresponding completion buffer completion bits are set, thereby enabling the instructions to graduate and release their associated completion buffer identification values. In one embodiment, control logic (not shown) ensures that one program thread does not consume more than its share of completion buffer entries.

Decoded instructions are written to a decoded instruction buffer 113. An instruction dispatcher 115 selects instructions residing in decoded instruction buffer 113 for dispatch to execution units 102. In embodiments, instructions can be dispatched for execution out-of-program-order to execution units 102. In one embodiment, instructions are selected and dispatched, for example, based on their age (ID tags) assuming that their operands are determined to be ready.

Instruction execution units 102 execute instructions as they are dispatched. During execution, operand data is obtained as appropriate from data cache 114, register file 130, and/or completion buffer 128. Multiplexer 124 may be used to obtain the operand data from register file 130 and/or completion buffer 128. A result calculated by instruction execution units 102 for a particular instruction is written to a location/entry of completion buffer 128 specified by the instruction's associated completion buffer identification value.

Instruction graduation (represented in FIG. 1A by instruction graduation unit 126) is controlled by a graduation controller 119. Graduation controller 119 graduates instructions in accordance with the completion buffer identification values stored in graduation buffer 121. When an instruction graduates, its associated result is transferred from completion buffer 128 to register file 130. In conjunction with instruction graduation, graduation controller 119 updates, for example, the free list of completion buffer allocater 111 to indicate a change in availability status of the graduating instruction's assigned completion buffer identification value.

Figure 2:
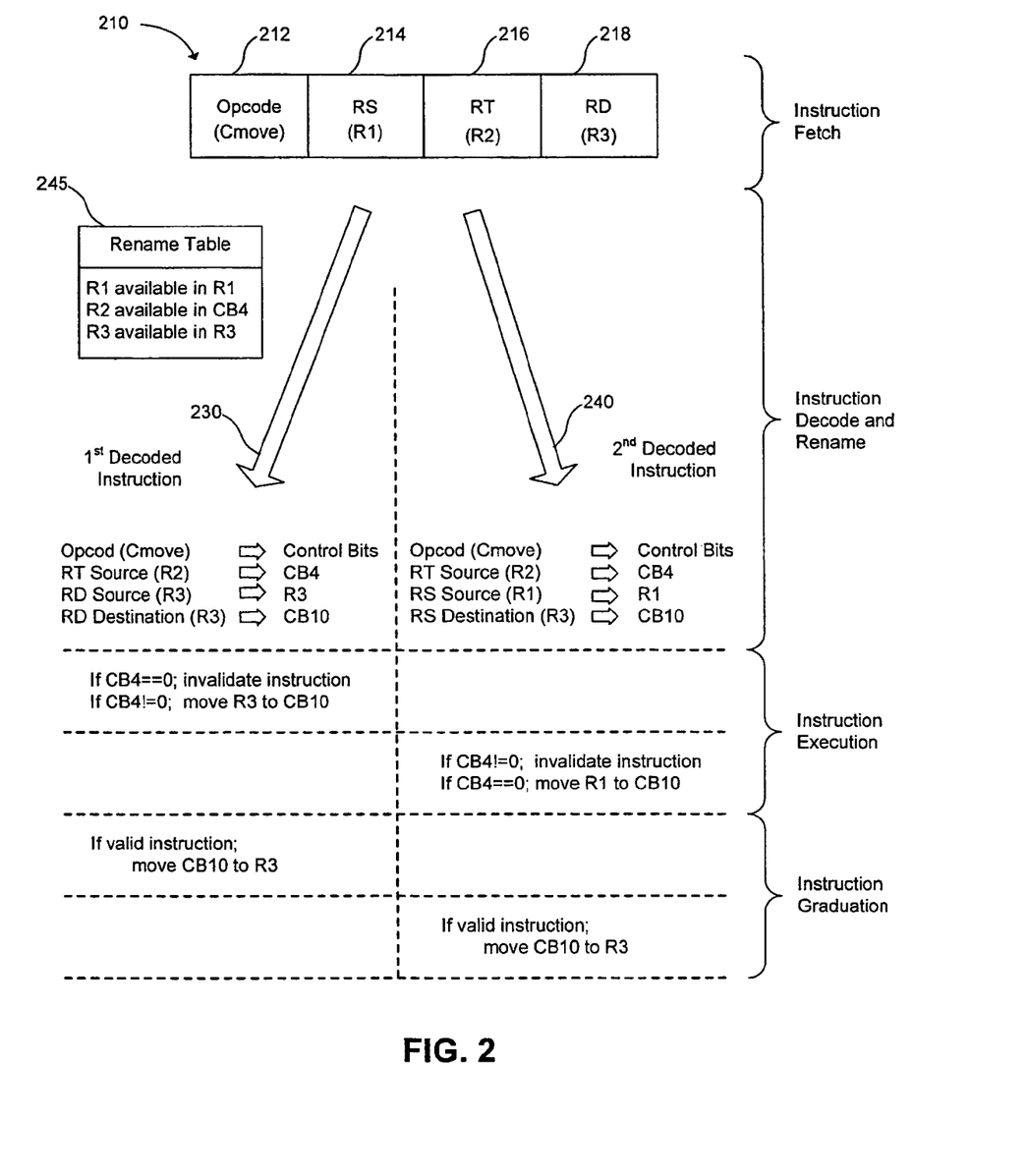
FIG. 2 is a diagram that illustrates an example manner in which a conditional move instruction is implemented in accordance with an embodiment of the present invention

FIG. 2 illustrates how processor 100 implements a conditional move instruction 210 in accordance with an embodiment of the present invention. Conditional move instruction 210 implements Equation 1 and the pseudo code shown in Table 1 below.

$$RD=(RT==0)?RS:RD \qquad (Eq. 1)$$

wherein RD is a source register and a destination register,
RT is a source register, and
RS is a source register.

TABLE 1

CONDITIONAL MOVE INSTRUCTION

* Form two decoded instructions *
* Issue first decoded instruction *
if (RT = = 0){
   invalidate first decoded instruction
}
if (RT != 0){
   write value of RD to completion buffer
}
* Issue second decoded instruction *
if (RT != 0){
   invalidate second decoded instruction
}
if (RT == 0){
   write value of RS to completion buffer
}

As illustrated by FIG. 2, conditional move instruction 210 is retrieved by processor 100 during instruction fetch. Conditional move instruction 210 includes an opcode field 212, a first operand field 214, a second operand field 216, and a third operand field 218. In the example shown in FIG. 2, the first operand field 214 specifies the contents of register R1 as a first source operand. The second operand field 216 specifies the contents of register R2 as a second source operand. The third operand field 218 specifies the contents of register R3 as a third source operand, and it specifies register R3 as the destination register for the result of conditional move instruction 210.

Conditional move instruction 210 is used to form two decoded instructions 230 and 240 during instruction decode and rename. The first decoded instruction 230 is formed by decoding the bits of opcode field 212 to form control bits. The RT source operand of conditional move instruction 210 (the value stored in register R2) is renamed using rename table 245. As shown in rename table 245, the required value is available in completion buffer register 4 (CB4). The RD source operand of conditional move instruction 210 (the value stored in register R3) is available in register R3, and thus operand renaming is not required. Finally, completion buffer register 10 (CB10) is allocated (e.g., by results allocation buffer 111) as a destination register to temporarily store any result of the first decoded instruction.

The second decoded instruction 240 is formed in a manner similar to the first decoded instruction. As shown in FIG. 2, the second decoded instruction is formed by decoding the bits of opcode field 212 to form control bits. The RT source operand of conditional move instruction 210 (the value stored in register R2) is renamed using rename table 245. As shown in rename table 245, the required value is available in completion buffer register 4 (CB4). The RS source operand of conditional move instruction 210 (the value stored in register R1) is available in register R1, and thus operand renaming is not required. Finally, completion buffer register 10 (CB10) is allocated as a destination register to temporarily store any result of the second decoded instruction. This is the same completion buffer register allocated as the destination register to temporarily store any result of the first decoded instruction.

Following instruction decode and rename, the two decoded instructions 230 and 240 are issued to an execution unit 102. In an embodiment, the decoded instructions 230 and 240 are issued to a load/store unit.

In an embodiment, neither the first decoded instruction nor the second decoded instruction is issued until all three source operands are available, either in the register file of the processor or in a completion buffer register. In an embodiment, once the operands are available, the first decoded instruction 230 is issued for execution.

As shown in FIG. 2, in an embodiment, if the value stored in CB4 equals a predetermined value, for example zero, the first decoded instruction is invalidated. If the value stored in CB4 is not equal to the predetermined value, the value stored in register R3 is written/moved to completion buffer register 10.

Sometime after decoded instruction 230 is issued, decoded instruction 240 is issued. Decoded instructions 230 and 240 need not be issued in consecutive cycles. As shown in FIG. 2, in an embodiment, if the value stored in CB4 is not equal to the predetermined value (e.g., zero), the second decoded instruction is invalidated. If the value stored in CB4 equals the predetermined value, the value stored in register R1 is written/moved to completion buffer register 10.

During instruction graduation, if first decoded instruction 230 is a valid instruction, the contents of CB10 are moved to register R3 upon graduation of first decoded instruction 230. If, however, first decoded instruction 230 is an invalid instruction, and second decoded instruction 240 is a valid instruction, the contents of CB10 are moved to register R3 upon graduation of second decoded instruction 240.

It is to be appreciated that FIG. 2 is presented for illustrative purposes only, and not limitation. For example, operands other than registers R1, R2, and R3 may be specified by conditional move instruction 210 without deviating from the spirit and scope of the present invention. Further, the designation of the first and second decoded instructions is for convenience only and is not intended to limit the order in which the decoded instructions are issued for execution. For example, the second decoded instruction may, in some processor architectures, be issued for execution before the first decoded instruction.

Figure 3:
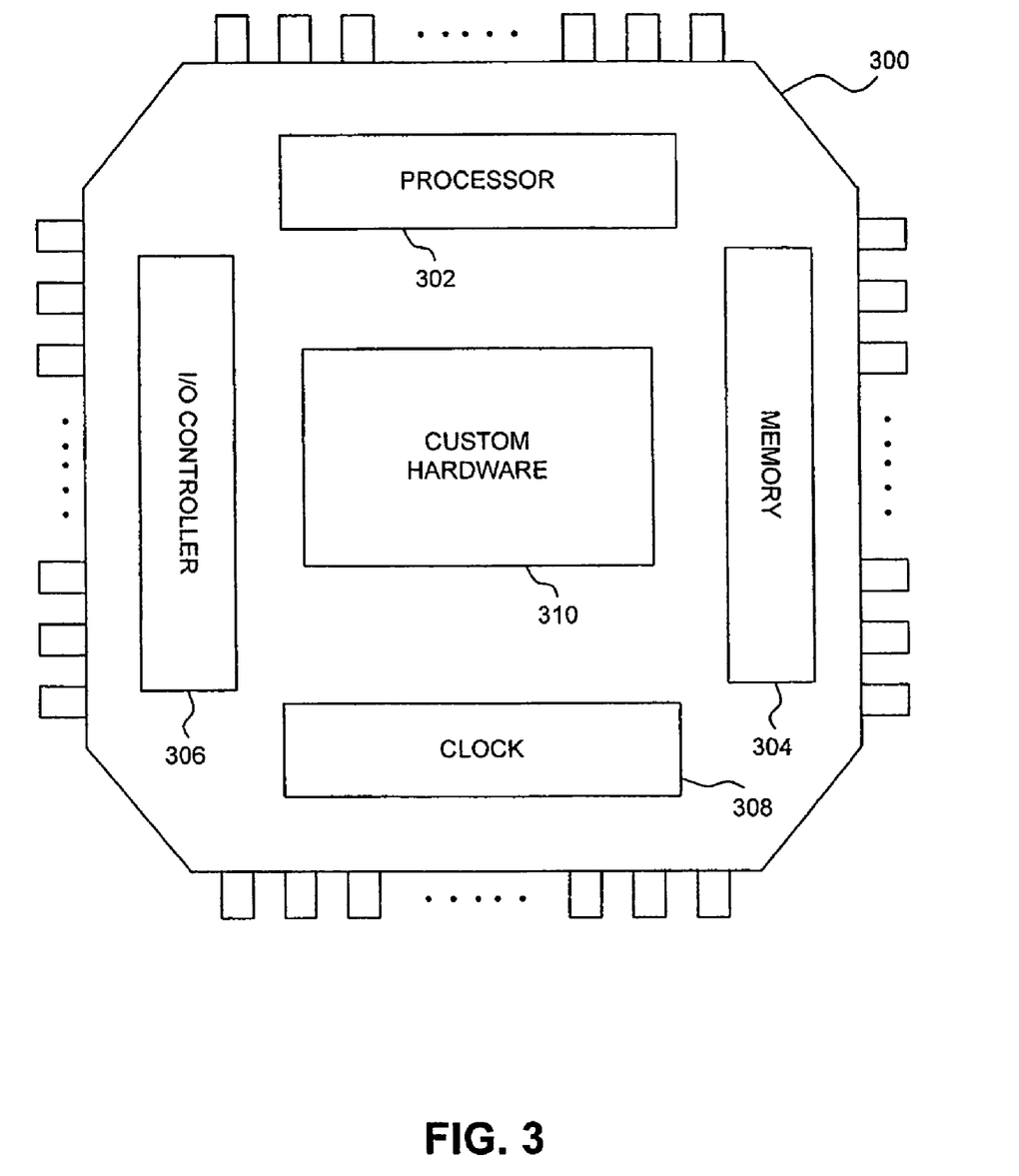
FIG. 3 is a diagram that illustrates an example system according to an embodiment of the present invention.

FIG. 3 is a diagram of an example system 300 according to an embodiment of the present invention. System 300 includes a processor 302, a memory 304, an input/output (I/O) controller 306, a clock 308, and custom hardware 310. In an embodiment, system 300 is a system on a chip (SOC) in an application specific integrated circuit (ASIC).

Processor 302 is any processor that includes features of the present invention described herein and/or implements a method embodiment of the present invention. In one embodiment, processor 302 includes an instruction fetch unit, an instruction cache, an instruction decode and dispatch unit, one or more instruction execution unit(s), a data cache, an instruction graduation unit, a register file, and a bus interface unit similar to processor 100 described above.

Memory 304 can be any memory capable of storing instructions and/or data. Memory 304 can include, for example, random access memory and/or read-only memory.

Input/output (I/O) controller 306 is used to enable components of system 300 to receive and/or send information to peripheral devices. I/O controller 306 can include, for example, an analog-to-digital converter and/or a digital-to-analog converter.

Clock 308 is used to determine when sequential subsystems of system 300 change state. For example, each time a clock signal of clock 308 ticks, state registers of system 300 capture signals generated by combinatorial logic. In an embodiment, the clock signal of clock 308 can be varied. The clock signal can also be divided, for example, before it is provided to selected components of system 300.

Custom hardware 310 is any hardware added to system 300 to tailor system 300 to a specific application. Custom hardware 310 can include, for example, hardware needed to decode audio and/or video signals, accelerate graphics operations, and/or implement a smart sensor. Persons skilled in the relevant arts will understand how to implement custom hardware 310 to tailor system 300 to a specific application.

While various embodiments of the present invention have been described above, it should be understood that they have been presented by way of example, and not limitation. It will be apparent to persons skilled in the relevant computer arts that various changes can be made therein without departing from the scope of the invention. Furthermore, it should be appreciated that the detailed description of the present invention provided herein, and not the summary and abstract sections, is intended to be used to interpret the claims. The summary and abstract sections may set forth one or more but not all exemplary embodiments of the present invention as contemplated by the inventors.

For example, in addition to implementations using hardware (e.g., within or coupled to a Central Processing Unit ("CPU"), microprocessor, microcontroller, digital signal processor, processor core, System on Chip ("SOC"), or any other programmable or electronic device), implementations may also be embodied in software (e.g., computer readable code, program code and/or instructions disposed in any form, such as source, object or machine language) disposed, for example, in a computer usable (e.g., readable) medium configured to store the software. Such software can enable, for example, the function, fabrication, modeling, simulation, description, and/or testing of the apparatus and methods described herein. For example, this can be accomplished through the use of general programming languages (e.g., C, C++), hardware description languages (HDL) including Verilog HDL, VHDL, SystemC Register Transfer Level (RTL) and so on, or other available programs, databases, and/or circuit (i.e., schematic) capture tools. Such software can be disposed in any known computer usable medium including semiconductor, magnetic disk, optical disk (e.g., CD-ROM, DVD-ROM, etc.) and as a computer data signal embodied in a computer usable (e.g., readable) transmission medium (e.g., carrier wave or any other medium including digital, optical, or analog-based medium). As such, the software can be transmitted over communication networks including the Internet and intranets.

It is understood that the apparatus and method embodiments described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the above-described exemplary embodiments, but should be defined only in accordance with the following claims and their equivalence.

What is claimed is:

1. A processor that implements a conditional move instruction, comprising:
    an instruction decode and dispatch unit configured to receive the conditional move instruction comprising a first, second, and third operand, the third operand being both a source and a destination, to output a first decoded instruction comprising the second and third operands from the conditional move instruction and a second decoded instruction comprising the first and second operands from the conditional move instruction, and to allocate a register in a completion buffer as a destination register to temporarily store any result of the first and second decoded instructions,
    wherein the first decoded instruction causes the processor to move the third operand to the completion buffer register if a first condition is satisfied, and the second decoded instruction causes the processor to move the first operand to the completion buffer register if the first condition is not satisfied,
    wherein the first condition is evaluated by comparing the second operand from the conditional move instruction with a predetermined value,
    a hardware execution unit, coupled to the instruction decode and dispatch unit, configured to execute the first decoded instruction and the second decoded instruction, and;
    a graduation unit configured to graduate either the first or the second decoded instruction,
        wherein, if the first condition is not satisfied, the second decoded instruction is graduated and the first decoded instruction is invalidated, and
        wherein, if the first condition is satisfied, the first decoded instruction is graduated and the second decoded instruction is invalidated.

2. The processor of claim 1, wherein the graduation unit is configured to, during graduation, transfer the first or third operand stored in the completion buffer register to a register specified by the third operand of a register file of the processor.

3. The processor of claim 1, wherein the hardware execution unit executes decoded instructions out-of-program-order.

4. The processor of claim 1, wherein the hardware execution unit is a load/store unit.

5. A method for implementing a conditional move in a processor, comprising:
    forming a first decoded instruction and a second decoded instruction from a conditional move instruction comprising a first, second, and third operand, the third operand being both a source and a destination, wherein the first decoded instruction comprising the second and third operands from the conditional move instruction causes the processor to move the third operand to a completion buffer register if a first condition is satisfied, and the second decoded instruction comprising the first and second operands from the conditional move instruction causes the processor to move the first operand to the completion buffer register if the first condition is not satisfied;
    allocating a register in a completion buffer as a destination register to temporarily store any result of the first and second decoded instructions;
    executing the first decoded instruction and the second decoded instruction;
    graduating the second decoded instruction and invalidating the first decoded instruction if the first condition is not satisfied;
    graduating the first decoded instruction and invalidating the second decoded instruction if the first condition is satisfied.

6. The method of claim 5, further comprising:
    transferring the first or third operand from the completion buffer to a register specified by the third operand of a register file of the processor.

7. A method for implementing in a processor a conditional move instruction that specifies a first operand, a second operand, and a third operand, the method comprising:
    forming a first decoded instruction comprising the second and third operands from the conditional move instruction and a second decoded instruction comprising the first and second operands from the conditional move instruction, wherein the first decoded instruction causes the processor to move the third operand to a completion buffer register if the second operand is not equal to a predetermined value, and the second decoded instruction causes the processor to move the first operand to the completion buffer register if the second operand is equal to the predetermined value;
    allocating a register in a completion buffer as a destination register to temporarily store any result of the first and second decoded instructions;
    if the second operand is equal to the predetermined value, graduating the second decoded instruction, thereby altering an architectural state of the processor according to the second decoded instruction, and invalidating the first decoded instruction; and
    if the second operand is not equal to the predetermined value, graduating the first decoded instruction, thereby altering the architectural state of the processor according to the first decoded instruction, and invalidating the second decoded instruction.

8. A method for implementing a conditional move instruction, comprising:
   receiving the conditional move instruction comprising a first, second, and third operand, the third operand being both a source and a destination;
   forming a first decoded instruction comprising the second and third operands from the conditional move instruction and a second decoded instruction comprising the first and second operands from the conditional move instruction;
   allocating a register in a completion buffer as a destination register to temporarily store any result of the first and second decoded instructions;
   executing the decoded instructions, and
   graduating one of the decoded instructions,
   wherein if a first condition is satisfied, the first decoded instruction is invalidated and the second decoded instruction is graduated such that the second decoded instruction causes the first operand to be moved to the allocated completion buffer register, and
   wherein if the first condition is not satisfied, the second decoded instruction is invalidated and the first decoded instruction is graduated such that the first decoded instruction causes the third operand to be moved to the allocated completion buffer register.

9. The method of claim 8, wherein the conditional move instruction specifies a plurality of operands and executing one of the decoded instructions comprises:
   executing one of the decoded instructions based on one of the operands.

10. The method of claim 8, wherein the conditional move instruction specifies a plurality of operands and executing one of the decoded instructions comprises:
   moving an identified one of the operands to a completion buffer register.

11. A processor that implements a conditional move instruction, comprising:
   an instruction decode and dispatch unit configured to receive the conditional move instruction comprising a first, second, and third operand, the third operand being both a source and a destination, to output, without stalling the instruction decode and dispatch unit, a first decoded instruction comprising the second and third operands from the conditional move instruction and a second decoded instruction comprising the first and second operands from the conditional move instruction, and to allocate a register in a completion buffer as a destination register to temporarily store any result of the first and second decoded instructions,
   wherein the first decoded instruction causes the processor to move the third operand to the completion buffer register if a first condition is satisfied, and the second decoded instruction causes the processor to move the first operand to the completion buffer register if the first condition is not satisfied,
   a hardware execution unit, coupled to the instruction decode and dispatch unit, configured to execute the first decoded instruction and the second decoded instruction and;
   a graduation unit configured to graduate either the first or the second decoded instructions,
   wherein, if the first condition is not satisfied, the second decoded instruction is graduated and the first decoded instruction is invalidated, and
   wherein, if the first condition is satisfied, the first decoded instruction is graduated and the second decoded instruction is invalidated.

12. A method for implementing a conditional move in a processor, comprising:
   forming a first decoded instruction and a second decoded instruction from a conditional move instruction comprising a first, second, and third operand, the third operand being both a source and a destination, without stalling a decode stage of the processor, wherein the first decoded instruction comprising the second and third operands from the conditional move instruction causes the processor to move the third operand to a completion buffer register if a first condition is satisfied, and the second decoded instruction comprising the first and second operands from the conditional move instruction causes the processor to move the first operand to the completion buffer register if the first condition is not satisfied;
   allocating a register in a completion buffer as a destination register to temporarily store any result of the first and second decoded instructions;
   executing the first decoded instruction and the second decoded instruction, and
   graduating one of the decoded instructions,
   wherein, if a first condition is satisfied, the second decoded instruction is invalidated and the first decoded instruction is graduated, and
   wherein, if a first condition is not satisfied, the first decoded instruction is invalidated and the second decoded instruction is graduated.

13. A processor that implements a conditional move instruction, comprising:
   an instruction decode and dispatch unit configured to receive the conditional move instruction comprising a first, second, and third operand, the third operand being both a source and a destination and to output a first decoded instruction comprising the second and third operands from the conditional move instruction and a second decoded instruction comprising the first and second operands from the conditional move instruction,
   wherein the first decoded instruction causes the processor to move the third operand to a completion buffer register if a first condition is satisfied, and the second decoded instruction causes the processor to move the first operand to the completion buffer register if the first condition is not satisfied,
   a hardware execution unit, coupled to the instruction decode and dispatch unit, configured to execute the first decoded instruction and the second decoded instruction, and;
   a graduation unit configured to graduate either the first or the second decoded instruction,
   wherein, if the first condition is not satisfied, the second decoded instruction is graduated and the first decoded instruction is invalidated, and
   wherein, if the first condition is satisfied, the first decoded instruction is graduated and the second decoded instruction is invalidated.

14. A processor that implements a conditional move instruction, comprising:
   an instruction decode and dispatch unit configured to receive the conditional move instruction that specifies a first source operand, a second source operand, and a third source operand that is both a source and a destination, and to output a first decoded instruction and a second decoded instruction;

a hardware execution unit, coupled to the instruction decode and dispatch unit, configured to execute the first decoded instruction and the second decoded instruction; and a graduation unit configured to graduate either the first or the second decoded instruction, wherein, if a first condition is not satisfied, the first decoded instruction is invalidated and the second decoded instruction is graduated such that the second decoded instruction causes the first source operand to be moved to an allocated completion buffer register, and wherein, if the first condition is satisfied, the second decoded instruction is invalidated and the first decoded instruction is graduated such that the first decoded instruction causes the third source operand to be moved to the allocated completion buffer register.

* * * * *